July 12, 1927.

L. B. SKOGLUND 1,635,290

SAWING MACHINE

Filed June 9, 1926

INVENTOR.
Leonard B. Skoglund
BY
James W. Martin
ATTORNEY.

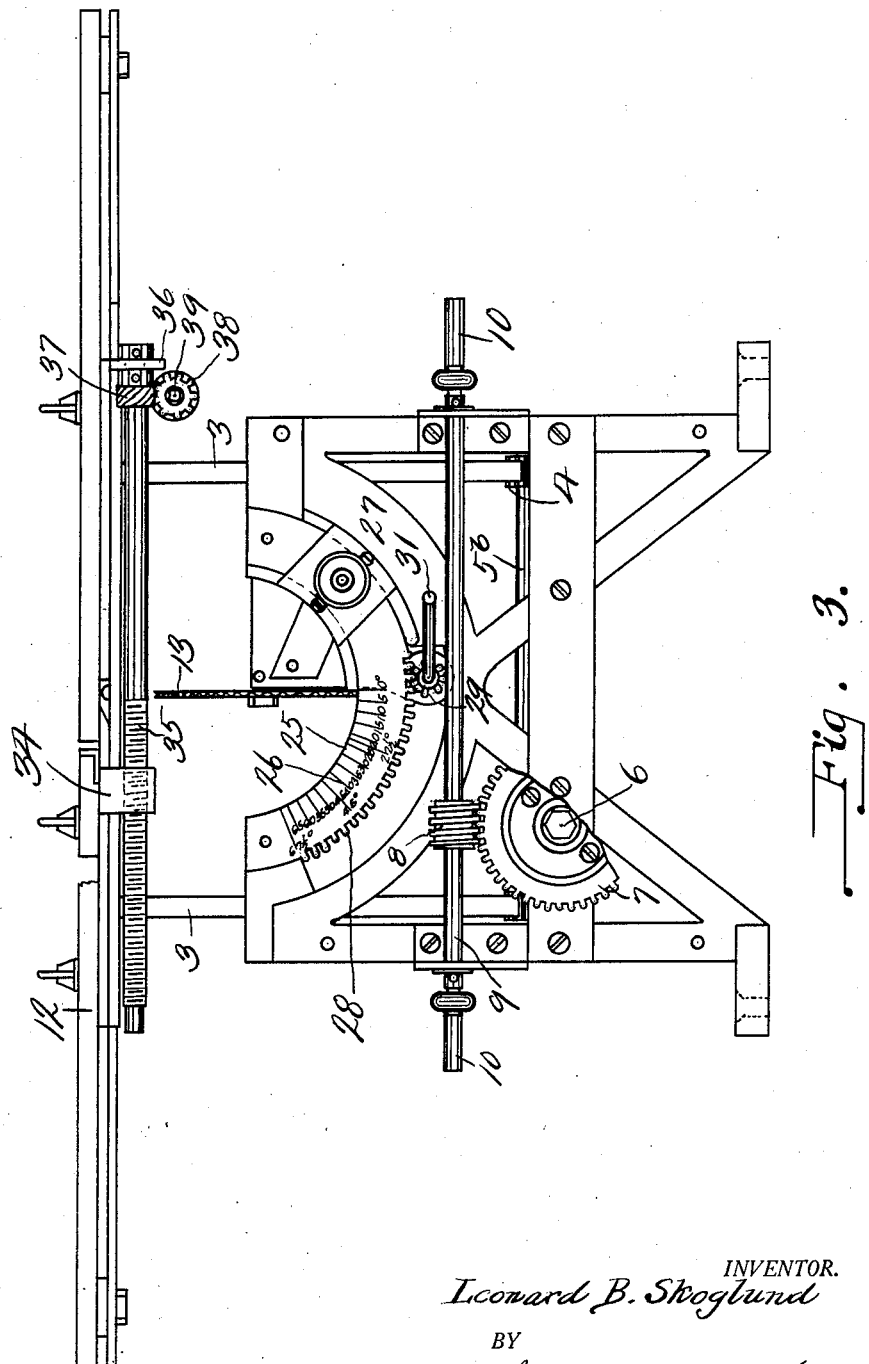

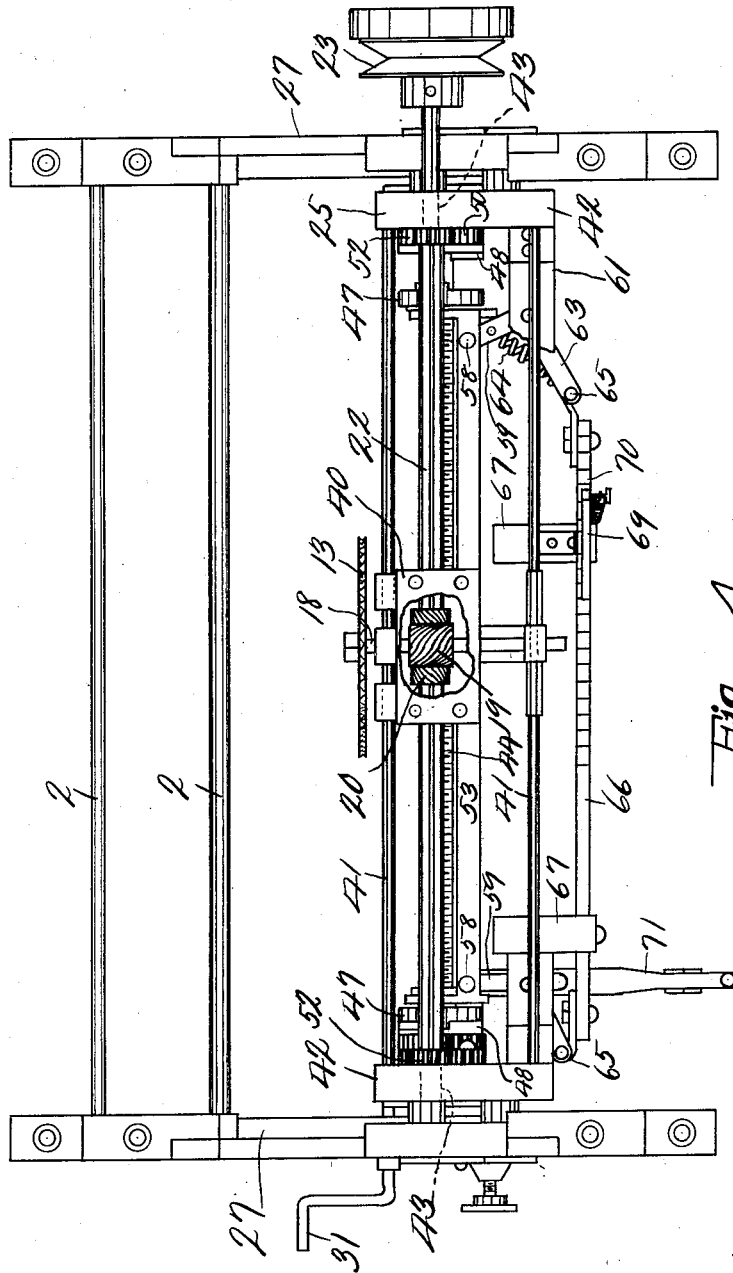

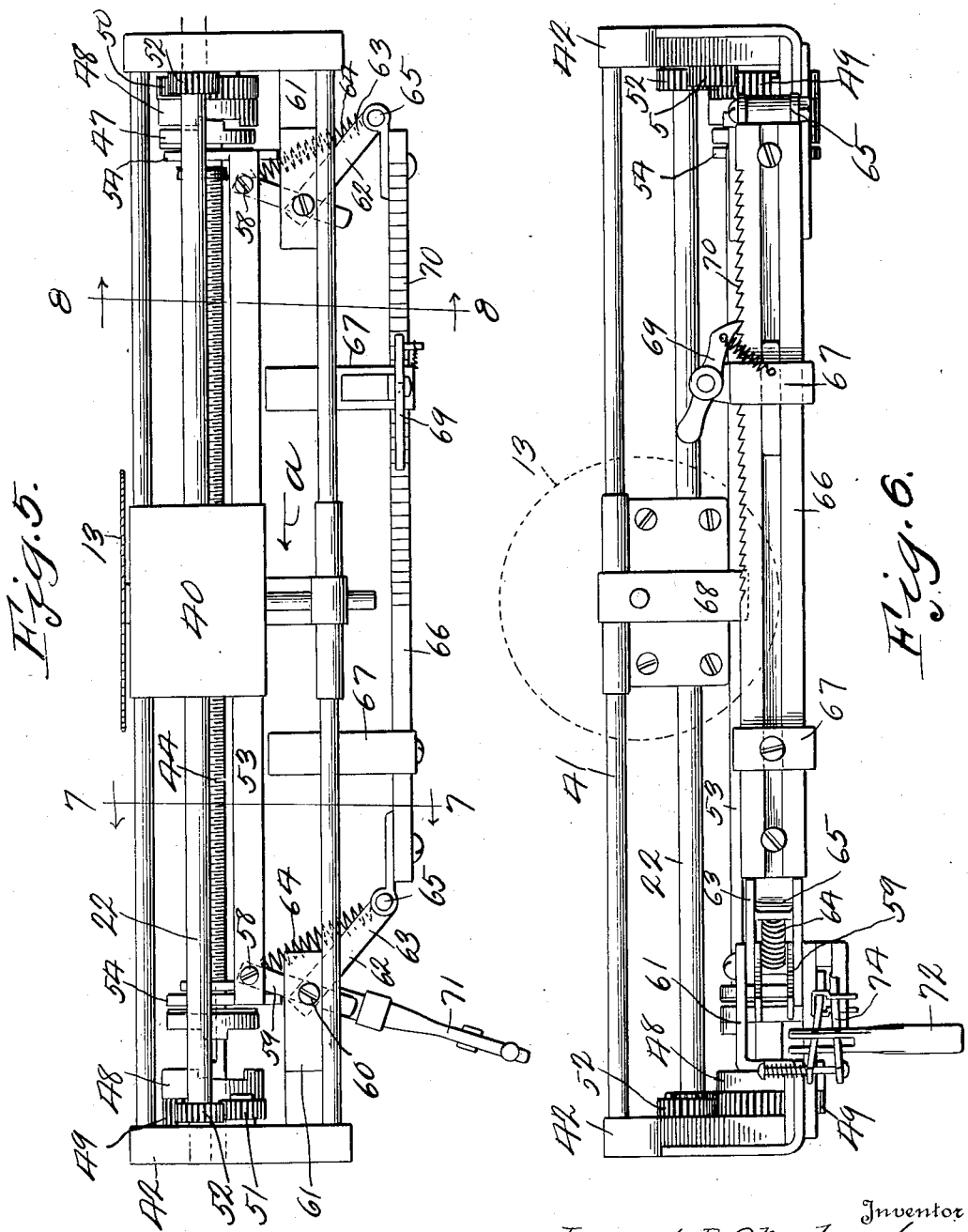

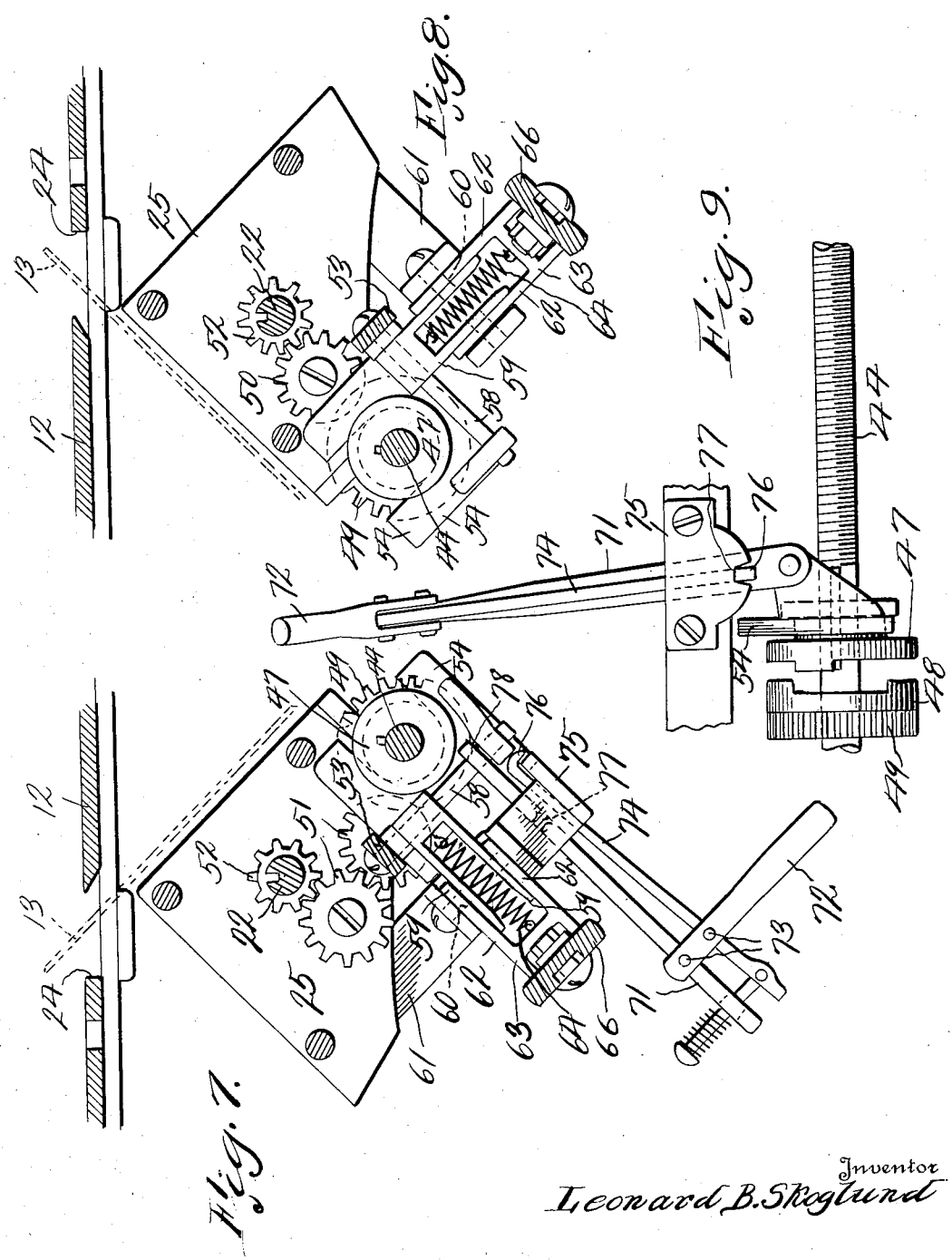

Patented July 12, 1927.

1,635,290

UNITED STATES PATENT OFFICE.

LEONARD B. SKOGLUND, OF FREMONT, NEBRASKA.

SAWING MACHINE.

Application filed June 9, 1926. Serial No. 114,697.

The invention relates to sawing machines, and has for its object to provide a device of this character particularly adapted for use by carpenters and for general work, and provided with means whereby a board or piece of wood may be severed at various angles, beveled or mortised if desired.

A further object is to provide a sawing machine comprising a frame and a circular saw carried by said frame beneath the table and which table may be adjusted upwardly or downwardly in relation to the saw in a horizontal plane whereby kerfs or channels may be formed in the under side of a board of uniform depth. Also to provide means whereby the table may be laterally moved in relation to the saw.

A further object is to provide means whereby the saw may be tilted to various inclinations thereby allowing a bevel of a predetermined degree to be formed on a piece of material carried by the table or a mitre joint to be accurately formed. Also to provide means whereby the circular saw during the operation thereof will traverse the table longitudinally thereby feeding the saw to a piece of material and away from the piece of material after the sawing operation.

A further object is to mount the circular saw and its driving mechanism on a rockable frame carried by arcuate plates at the end of the device and slidably mounted in guides and gear means cooperating with said plates whereby the same may be accurately moved for tilting the saw blade. Also to provide a driven feed screw having clutch mechanisms at opposite ends thereof and which feed screw is threaded through the mandrel block and the clutch mechanisms controlled by a reversing mechanism and by means of which clutch and reverse mechanism the direction of traverse of the saw is automatically changed. Also to provide manual means for controlling the reversing mechanism or for holding the reversing mechanism in inoperative position for preventing the longitudinal movement of the saw when desired.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 3 is an end elevation of the sawing machine.

Figure 4 is a top plan view of the sawing machine showing the table removed to better show the structure.

Figure 5 is an enlarged top plan view of the reversing mechanism.

Figure 6 is a side elevation of the reversing mechanism.

Figure 7 is a transverse sectional view taken on line 7—7 of Figure 5, but showing the mechanism tilted for positioning the saw at an angle.

Figure 8 is a transverse sectional view taken on line 8—8 of Figure 5 showing the saw mechanism at an angle.

Figure 9 is an enlarged bottom plan view of the clutch control lever and one of the clutches.

Figure 1:
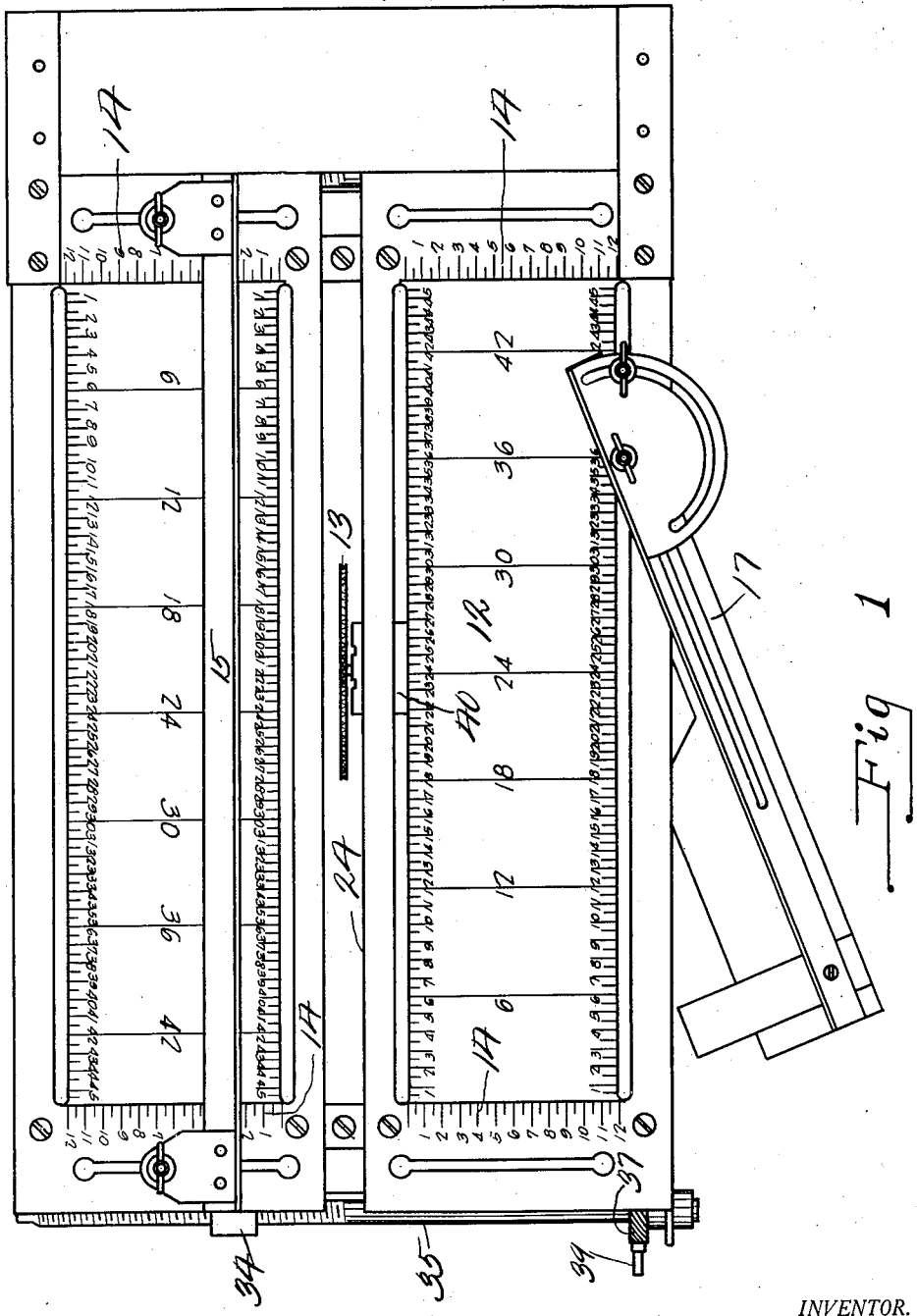
Figure 1 is a top plan view of the sawing machine.
Figure 2:
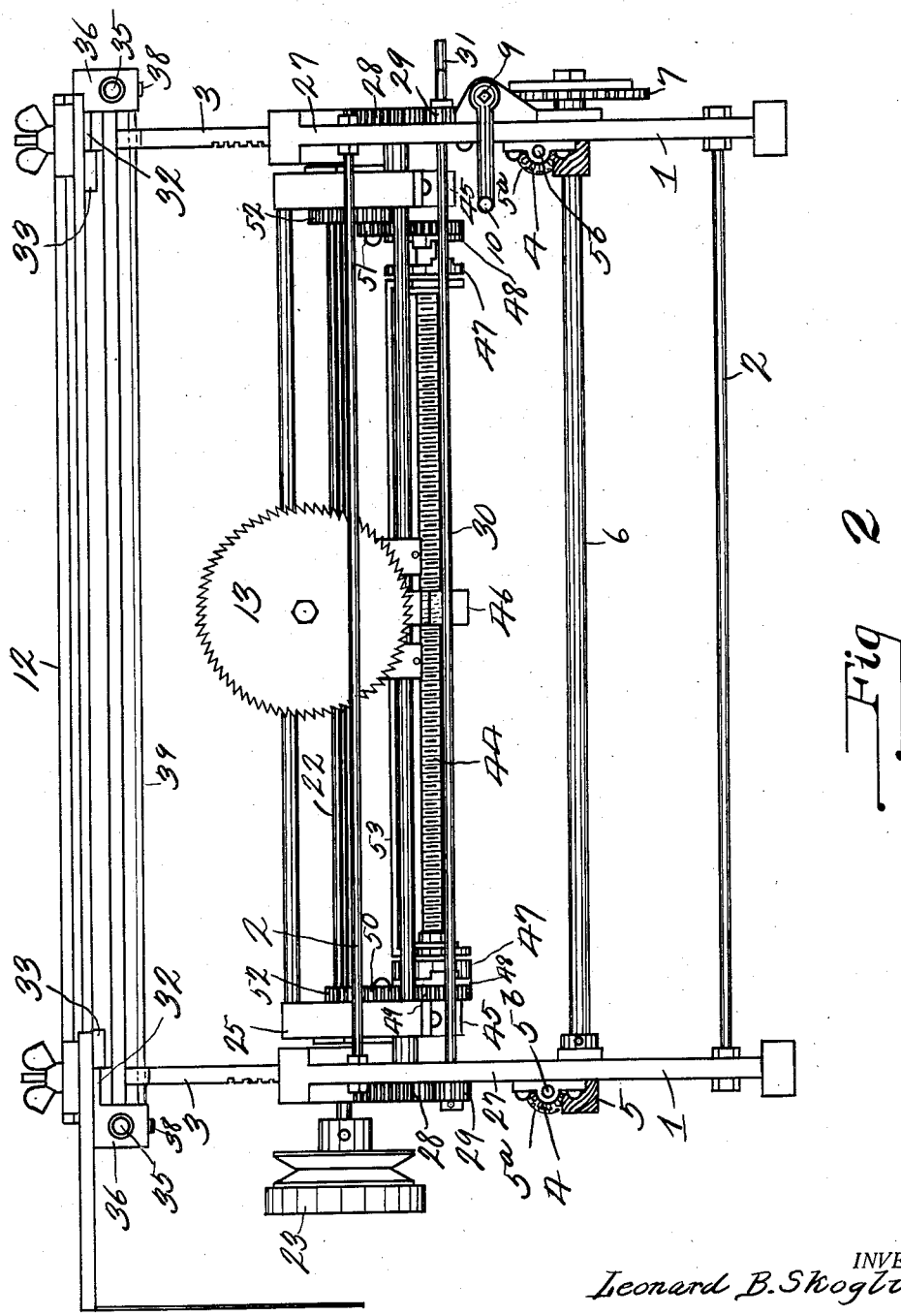
Figure 2 is a side elevation of the sawing machine showing the table raised.

Referring to the drawing, the numeral 1 designates the end frames of the machine, which frames are connected together by bars 2. Slidably mounted in bearings of the end frames 1 are vertically disposed racks 3, with which racks gears 4 mesh, and which gears 4 are rotated by worm gears 5 carried by the longitudinally disposed shaft 6, and which mesh with worm gears $5^a$ carried by the transversely disposed shafts $5^b$. One end of the shaft 6 is provided with a gear 7, with which a worm gear 8 carried by a transversely disposed shaft 9 meshes. The ends of the shaft 9 are provided with cranks 10, which are adapted to be grasped by the operator for rotating the shaft 9 and imparting rotation to the shaft 6 through the gears 8 and 7, when it is desired to raise or lower the saw table by raising or lowering the racks 3, which are preferably four in number. Mounted on the upper ends of the bars 3 is a saw table 12, and it will be seen said saw table may be easily and quickly moved upwardly or downwardly in relation to the circular saw 13 by rotating the cranks 10. The upper side of the saw table is provided with scales 14 which extend transversely of the table and which may be used in connection with an adjustable guide member 15 for various purposes, for instance when cutting a strip of uniform width. One side of the table is provided with an angularly adjustable guide member 17, which may be adjusted at various angles in relation to the saw 13 for making angular cuts. The saw 13 is carried by a mandrel 18 which is provided with a worm 19, and the worm 19 meshes with a worm gear 20 which is slidably keyed on the drive shaft 22, one end of which is provided with a drive pulley 23, therefore it will be seen that when the drive pulley 23 is rotated, the saw 13 will rotate therewith for a sawing operation, and when the table is in lowered position, the saw will extend upwardly through the saw slot 24 into engagement with a piece of material which may be on the table. Saw 13 and the mechanism for driving the same is carried by a rockable cradle 25, the ends of which are provided with arcuate members 26 which are slidably mounted in the guide plates 27 carried by the end frames 1 of the machine and the arcuate plates 26 are provided with gear teeth 28, with which gears 29 mesh. The gears 29 are carried by a longitudinally disposed shaft 30 which is rotatably mounted in bearings of the plates 27, and has its end provided with a crank 31 adapted to be grasped by the operator for rotating the gears 29 and moving the arcuate members 26 for disposing the saw 13 at various inclinations and angular positions in relation to the saw table 12, thereby allowing bevels to be formed at any desired angle which is particularly desirable in a sawing machine adapted for general use by carpenters, the angular positions are particularly shown in Figures 7 and 8.

The table 12 is laterally movable on the upper bars 32 of the rack bars 3 and is guided in its movement laterally and transversely by guide bars 33 carried by the under side of the table. The ends of the table are provided with blocks 34 through which are threaded shafts 35. One of the ends of the shafts 35 is rotatably mounted in the plates 36 and provided with worm gears 37, with which worm gears 38 carried by the longitudinally disposed operating shaft 39 mesh, and it will be seen when a crank is placed on the rectangular end of the shaft 39, and said shaft is rotated, both threaded shafts 35 will be simultaneously rotated, thereby moving the table 12 laterally for properly positioning the slot 24 in the table in relation to the saw, for instance when the saw is adjusted at an angle.

The mandrel 18 is carried by a casing 40, and which casing is slidably mounted on the guide rods 41, which connect the end plates 42 of the tiltable frame, and the drive shaft 22 is rotatably mounted in bearings 43 of said plates 42. The worm gear 20 is slidably keyed or feathered on the drive shaft 22, and it is obvious that as the shaft 18 and the worm 19 are carried by the casing 40, said saw 13 would be operated no matter where it is positioned longitudinally in relation to the drive shaft 22, and the mechanism hereinafter is designed to traverse the saw longitudinally in relation to the machine and to automatically reverse the direction of travel of the saw but not the direction of the rotation of the saw during the cutting operation, and to accomplish this result a threaded feed screw 44 is provided. The ends of the feed screw are rotatably mounted in bearings 45 of the plates 42 and the screw is threaded through the downwardly extending member 46 of the carriage 40. It will be noted when the feed screw 44 is rotated in one direction the saw casing 40 will move in one direction and when reversed the casing 40 will move in the opposite direction, and to accomplish this result clutch elements 47 are provided, which clutch elements are slidably keyed on the ends of the feed screw 44 as clearly shown in Figure 9. Rotatably mounted on the ends of the feed screw 44 are clutch elements 48, which are provided with integral gears 49, which in turn mesh with idle gears 50 and 51. It will be noted there are two idle gears 51, and with one of which the drive gear 52 meshes at one end of the drive shaft 22, and the drive gear 52 at the other end of the drive shaft 20 meshes with the single idle gear 50, therefore it will be seen that when one of the clutch elements 47 is in cooperative engagement with one of the rotatable clutch elements 48 the feed screw 44 will be rotated in one direction, and when the other clutch 47 is in clutched relation the feed screw will be reversed in its rotation. Sidable clutch members 47 are connected together by a bar 53, the ends of which terminate in bifurcated plates 54 which control the slidable movements of the clutch elements 47. Pivotally connected on bolts 58 carried by the bifurcated members 54 are outwardly extending U-shaped members 59, the arms of which are pivotally connected at 60 to brackets 61 carried by the plates 25, thereby forming a fixed point and to the arms 62 of an inwardly extending U-shaped member 63 and coiled springs 64 are connected to the ends of the U-shaped members 59 and 63 and pass between the arms thereof, therefore it will be seen that when the members 59 and 63 are moved in either direction beyond alined positions the coiled springs 64 will, through their contracting force, control the remote ends of the members 59 and 63, the purpose of which will presently appear. The outer ends of the U-shaped members 63 are hingedly connected at 65 to a connecting bar 66, and which connecting bar is provided with adjustable stops 67 in the path of a downwardly extending arm 68 carried by the casing 40. As the feed screw 44 moves the casing 40 longitudinally in the direction of the arrow a, Figure 5, the arm 68 will engage the stop 67 and move the bar 66 in the same direction as well as the outer end of the U-shaped member 63 which will move on its pivotal point 60 until the part 63 is beyond an alined relation with the U-shaped member 59, and at which time the coiled spring 64 will contact and cause the U-shaped members 59 and 63 to assume reversed angular positions to that shown in Figure 5, and at the same time the clutch member 47 is moved into clutched relation to the clutch member 48 thereby reversing the direction of rotation of the feed screw 44. As said last named clutch member is moved into operative position, the parts at the other end of the device are moved into declutched position, which allows a reverse direction of rotation of the feed screw for reversing the direction of traverse of the casing 40 and the saw. One of the adjustable stops 67 is provided with a spring actuated pawl 69 which cooperates with ratchet teeth 70 on the reversing bar 66, and which spring actuated pawl allows said last named stop to be easily and quickly adjusted. When it is desired to prevent traverse of the saw and hold both clutch elements out of clutched relation, the operating lever 71, better shown in Figure 9, is moved to a right angular position in relation to the device and an outward pull is imparted on the downwardly extending handle member 72 which is pivotally connected at 73 to the lever 71, and to the latching bar 74. The latching bar 74 extends over the plate 75 and is provided with a downwardly extending arm 76, which when moved into the notch 77 of the plate 75 will hold the reversing mechanism in an intermediate position against the action of the coiled spring 64. It will be noted that the lever 71 is interengaged with the plate 75 and is also pivotally connected at 78 to the bolt 58, therefore the lever has control of the yoke bar 53.

From the above it will be seen that a sawing machine is provided which is adapted for various uses, the same is positive in its operation, the saw may be tilted to various angles and traversed as desired. It will also be seen that the reversing of the movement of the saw is automatic and the power is obtained from a single source.

The invention having been set forth what is claimed as new and useful is:

1. The combination with a sawing machine comprising a frame, a rockable auxiliary frame mounted in the first mentioned frame, a drive shaft rotatably mounted in the auxiliary frame, a saw mandrel, a gear carried by the saw mandrel, a gear slidably keyed on the drive shaft and meshing with the mandrel gear, a rotatable feed screw carried by the auxiliary frame, driving connections between the ends of the feed screw and the drive shaft, clutch elements cooperating with said driving connections, and reversing mechanism cooperating with said clutch elements whereby when the mandrel reaches a predetermined position in its movement in either direction, the direction of rotation of the feed screw will be reversed.

2. The combination with a sawing machine having a traversing carriage, a mandrel carried by said carriage, a drive shaft extending through said carriage, a gear carried by the mandrel, a gear slidably mounted and keyed on the drive shaft and meshing with the mandrel gear, a rotatable feed screw threaded through the carriage and forming means for moving the carriage longitudinally in either direction, gear connections between the ends of the feed screw and the driving shaft, clutches slidably keyed on the feed screw, said clutches cooperating with clutch elements carried by the gear connections, a yoke connecting said clutch elements, of a longitudinally movable bar, stops carried by said bar, a stop carried by the carriage in the path of the bar, stops and spring actuated pivotally connecting members connecting the bar and the yoke and forming means whereby when one of said clutch elements is declutched the other clutch element is clutched.

3. The combination with a carriage feed screw of a sawing machine, said carriage having a drive shaft rotatably mounted therein, gear connections between the drive shaft and the ends of the feed screw whereby said feed screw may be rotated in either direction, clutch elements slidably keyed on the feed screw, clutch elements carried by the gear connections and adapted to receive either of the first mentioned clutch elements, of a longitudinally movable bar, spaced stops carried by said bar, an arm carried by the carriage and movable between the stops and in the path of the stops, inwardly extending links carried by the ends of the bar, the inner ends of said links being pivotally mounted, second inwardly extending links pivoted to the inner ends of the first mentioned links, a yoke connecting the first mentioned clutch elements, springs connecting the links together and forming means whereby when said links pass beyond alined position their angular relation will be reversed thereby clutching or declutching the first mentioned clutch elements.

In testimony whereof I hereunto affix my signature.

LEONARD B. SKOGLUND.